United States Patent [19]

Wille-Fier et al.

[11] Patent Number: 5,663,947
[45] Date of Patent: Sep. 2, 1997

[54] SWITCHING CONTROL SYSTEM FOR CONTROLLING PHYSICAL CONNECTION STRUCTURES IN A COMMUNICATIONS SYSTEM

[75] Inventors: Regina Wille-Fier, Deisenhofen, Germany; John Wayne Cutler, Coventry, Great Britain

[73] Assignees: Siemens Aktiengesellschaft, Munich, Germany; GPT Ltd., Coventry, Great Britain

[21] Appl. No.: 387,857
[22] PCT Filed: Aug. 17, 1993
[86] PCT No.: PCT/EP93/02191
  § 371 Date: May 30, 1995
  § 102(e) Date: May 30, 1995
[87] PCT Pub. No.: WO94/05120
  PCT Pub. Date: Mar. 3, 1994

[30] Foreign Application Priority Data

Aug. 25, 1992 [DE] Germany .................. 921 14 475.4

[51] Int. Cl.⁶ .................................................. H04Q 11/04
[52] U.S. Cl. .............................................. 370/360; 370/395
[58] Field of Search ........................... 370/60, 60.1, 58.1, 370/58.2, 58.3, 68.1, 110.1, 94.1, 54, 94.3

[56] References Cited

U.S. PATENT DOCUMENTS

| 4,761,779 | 8/1988 | Nara et al. ................................ 370/60 |
| 4,905,222 | 2/1990 | Seeger et al. ........................... 370/58.1 |
| 5,067,123 | 11/1991 | Hyodo et al. .......................... 370/58.1 |
| 5,390,171 | 2/1995 | Storm ..................................... 370/58.2 |

*Primary Examiner*—Alpus H. Hsu
*Assistant Examiner*—Ajit Patel
*Attorney, Agent, or Firm*—Hill, Steadman & Simpson

[57] ABSTRACT

The user system for controlling connections in a switching system should be decoupled from the hardware architecture of the switching system. The switching control system introduces an autonomous system for controlling connections at the physical level which system allows the user systems to formulate their connection requests in a manner which is independent of the hardware structure of the switching system.

4 Claims, 5 Drawing Sheets

SWITCHING CONTROL SYSTEM FOR CONTROLLING PHYSICAL CONNECTION STRUCTURES IN A COMMUNICATIONS SYSTEM

BACKGROUND OF THE INVENTION

In present-day switching systems, the user software for controlling the connections is still largely dependent on the hardware architecture of the switching system.

Switching application software which is split into a plurality of components is known from the article "Object Oriented Software Technologies Applied to Switching Architectures and Software Development Processes" by E. C. Arnold et al. from the "International Switching Symposium 1990, Volume 2, June 1990, Stockholm SE, pages 97–106". In this case, the components represent logic and physical system entities. The component "call" represent, for example, the system entity "call". In this case, the component "call" controls the system entity "call" both at the logic level and at the physical level (with the exception of the local physical connection control, which is carried out by the local components of the "fabric" type).

A layered switching control architecture is known from the article "Switch Architecture for the Intelligent Network" by Steve Cannon from the "Proceeding of the national communications forum, Volume 45, October 1991, Oak Brook, Ill., U.S., pages 185 to 193".

SUMMARY OF THE INVENTION

The invention is based on the problem of achieving decoupling of the user systems from the hardware architecture of the switching system.

This problem is solved by a switching control system of the present invention for controlling the physical connection structures in a switching system. The switching control system has the following features: means for receiving connection requests from at least one user system, the user system being used to control the logic connection structures, and a connection request containing identifiers for the connection end points affected by it; means for processing the said connection requests, which means calculate a physical path through the switching networks of the switching system on the basis of a connection request; and means for transmitting commands to resource systems for local control of the resources which are affected by the calculated physical path.

On the basis of the introduction of the central switching control system according to the invention, the user systems can formulate their connection requests in a manner which is independent of the hardware architecture of the switching system. This ensures that the user systems are independent of the hardware architecture of the switching system. Since the resource handling is carried out by autonomous resource systems, permanent assignment of the switching control system to a specific central control processor is unnecessary.

A further embodiment of the invention is characterized in that the means for processing the connection requests from a user system process received connection requests independently of one another. As a result of this embodiment, the independence of the switching control system according to the invention from the specific structure of a user system is further enhanced.

A further embodiment of the invention is characterized by means for transferring the data of the physical path which is set by the resource systems to the user system which submits the connection request. In the case of this embodiment of the invention, the switching control system requires no means for storing the path-related data of existing connections.

A switching system of the present invention has the following features: at least one control processor for carrying out central control processes; one, and only, switching control system as described above per control processor; at least one user system for controlling the logic connection structures per control processor; and local resource systems for controlling the resources of the switching system, which resource systems carry out commands of the switching control system. The switching system preferably has the advantage that the user systems are decoupled from the switching control system. This ensures that the user systems are independent of the physical connection structure, and thus of the architecture of the switching networks. Furthermore, in the case of the switching system the switching control system is in turn independent of the peripheral resource systems for controlling the physical resources of the switching system.

A further embodiment of the invention is characterized in that a user system is built up from a plurality of segments, and each segment autonomously carries out a subfunction of the logic connection controller. The switching system preferably has the advantage that the modularity of the user systems is enhanced.

A further embodiment of the invention is characterized in that one chain of entities of the required segments is built up per connection, a plurality of entities of the said chain are able to submit mutually independently produced connection requests to the switching control system, and this chain of a connection can extend over a plurality of control processors. On the one hand, it is made possible to divide the data base as request of the capability to divide the call chain over a plurality of control processors, while on the other hand it is made possible to deal with those functions of the connection controllers which are dependent on the type of signalling of a connection end point involved in the connection in that control processor which is responsible for controlling this connection end point. In consequence, improved dynamics and thus effectiveness of the modularized user system are achieved.

A further embodiment of the invention is characterized in that the user system includes a coordination system which coordinates the connection requests with respect to the switching control system in such a manner that, at a specific time, only one consistent connection request is in each case dealt with per connection by the switching control system. This has the advantage that the capability to modularize the user system is in consequence enhanced and, at the same time, the communications complexity for carrying out the connection control is kept low.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
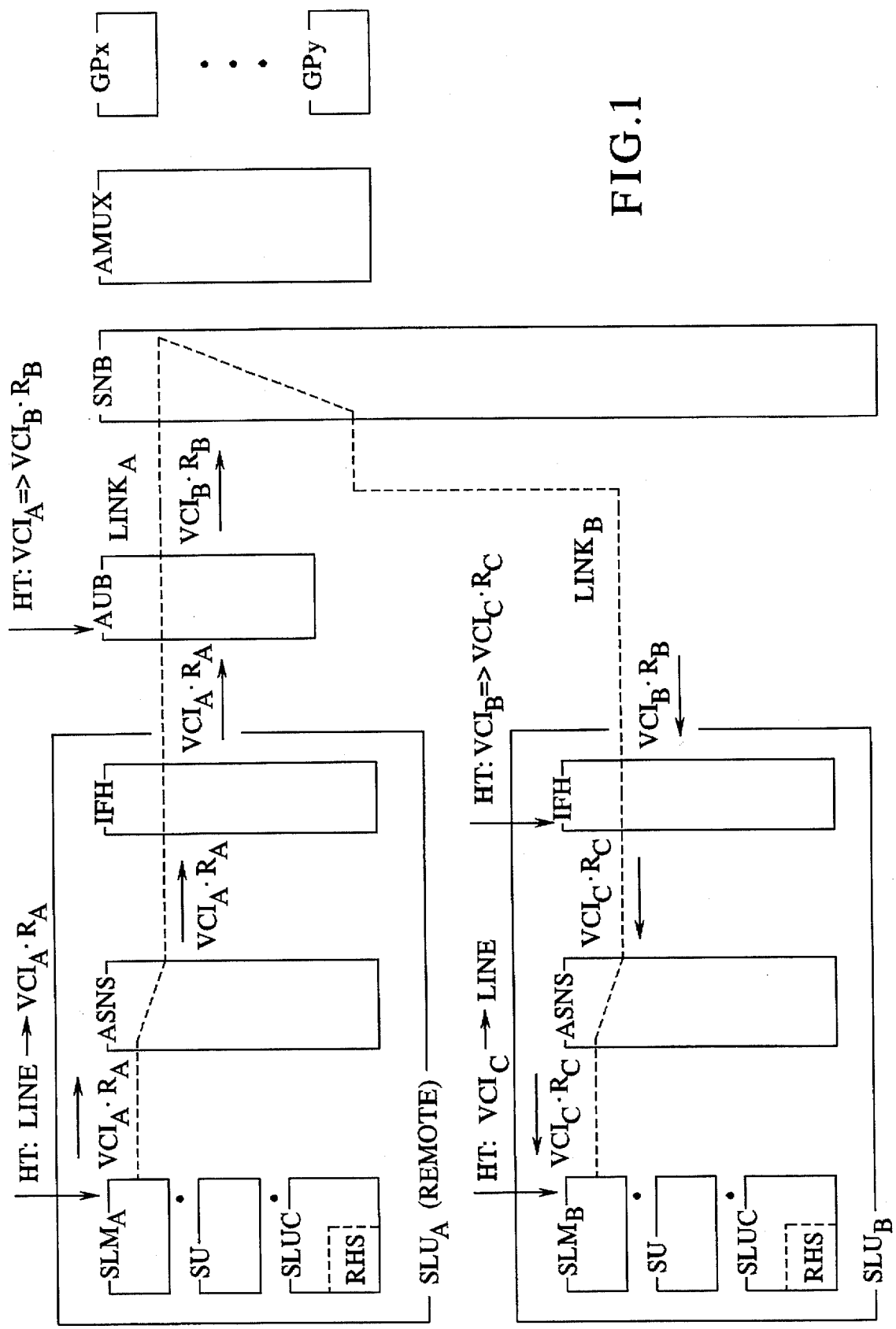
FIG. 1 shows the structure of an ATM switching system.

An exemplary embodiment of the invention is explained in the following text, with reference to the drawing.

FIG. 1 shows the structure of an ATM switching system.

In principle, the switching functions for setting up ATM or STM connections are comparable. Thus, for example, one path through the affected switching networks is defined for an ATM connection before the actual data transfer starts. All the cells in an ATM connection are transferred via this path. In generally, a plurality of connections will divide one ATM link. ATM cells which belong to the same connection are assigned the same VCI/VPI identifier (virtual connection/path identifier) in the cell header.

A selected path must be reserved in software lists for all the links which produce a traffic concentration, in order to prevent an overload on the ATM links.

The number of cells which are transferred in a specific time interval defines the bandwidth which is occupied on a link by a specific ATM connection. The associated bandwidth is monitored in a connection-specific manner by a user/network interface, in order to prevent unauthorized flooding of the switching network by a specific user (policing). The said software list is controlled by a software resource system RHS, which is implemented in a controlled unit SLUC of a subscriber unit SLU.

The VCI/VPI identifier which is assigned to a specific ATM connection and is abbreviated to the designation VCI in FIG. 1 is always valid for a specific link. Before the ATM cells are passed on on another link, a new VCI/VPI identifier is entered in the header of an ATM cell (header translation HT). This header translation is likewise carried out at the user/network interface, which is not illustrated.

The header translation is also carried out before every switching network. In this case, a routing identifier R which describes the defined path through the following switching network, is attached to an ATM cell at the same time as the entry of a new VCI/VPI identifier. The routing identifier R is evaluated within the following switching networks in order to route the cell to the correct outgoing link. For a virtual path, only the VPI interface is recalculated in the interface circuit IFH or in the access device AU (in the case of a remote SLU), while the VCI identifier which is assigned to the individual connections remains unchanged. All the cells having the same VPI identifier thus receive the routing identifiers, as a result of which it becomes possible to switch a plurality of virtual connections via the same virtual path in a transparent manner.

FIG. 1 shows the header translation for a virtual ATM connection via the main switching network SNB. A one-way connection from a subscriber line unit SLUA to a subscriber line unit SLUB is illustrated as a virtual ATM connection. The header translations carried out for one ATM cell are described in more detail in the following text.

The first header translation HT is carried out by the subscriber module SLMA. The routing identifiers RA for the path through the local switching network ASNS of the subscriber unit SLUA are added to the ATM cells, and the VCIA identifier is entered in the header of the ATM cells, in this subscriber module.

The second header translation for the central switching network SNB is implemented by means of the broadband access device AUB. In this broadband access device, all the incoming cells having the path identifier VCIA receive a new path identifier VCIB and a new routing identifier RB for the path through the main switching network SNB.

The third and last header translation is carried out in the IFH in the subscriber unit SLUB at the B-end. There, all the incoming cells having the path identifier VCIB receive a new path identifier VPIC, as well as new routing identifiers RC for the path through the local switching network ASNS of the subscriber unit SLUB.

Figure 2:
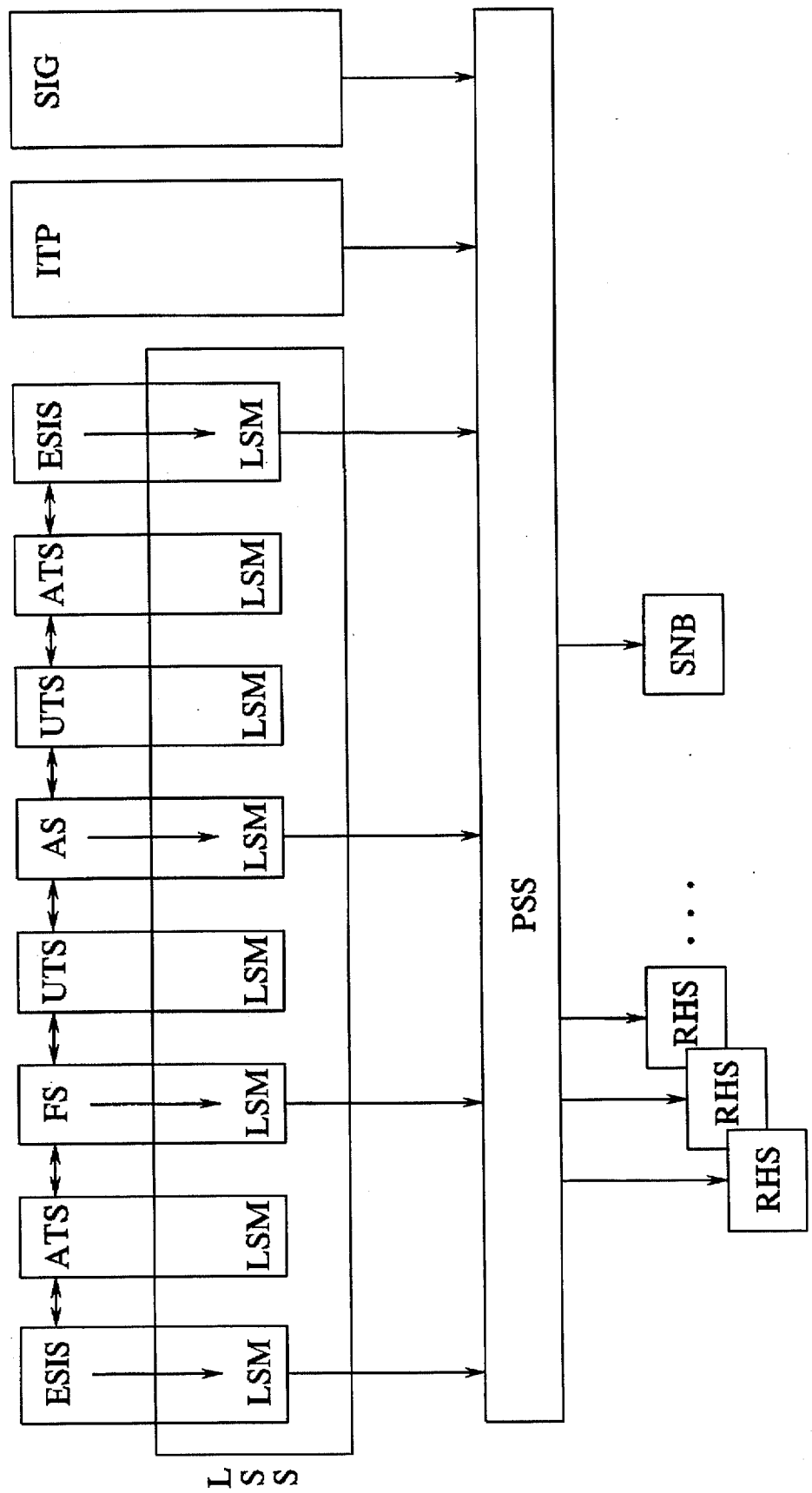
FIG. 2 shows the modular construction of the call processing system.

FIG. 2 shows the functional composition of a specific user system, namely the call processing system for controlling calls and its arrangement with respect to further software systems for controlling connections within a switching system.

The call processing system comprises a call control system CCS for controlling a connection at the logic level, an interface system ESIS for shielding the call control system from different signalling variants, and a coordination system LSS for coordination of the logic connection requests, which are produced by the call control system, with respect to a switching control system PSS. The interface system ESIS and the call control system CCS are also called the call connection system in the following text, for the purposes of summarizing.

Furthermore, a processing system ITP for system administration and a processing system SIG for signalling administration are illustrated at the same level as the call processing system. Like the call processing system, these processing systems include connection systems which use the switching control system PSS in the same manner in order to implement their logic connection wishes at the physical level.

In the lowest level, FIG. 2 furthermore shows a resource system RHS for controlling the resources of the switching system, and the main switching network SNB which is controlled by the switching control system, as a single resource of the switching system, in a direct manner.

The call processing system is described in more detail in the following text.

The ESIS provides the shielding of the call control system CCS from different signalling variants, in that it converts the different signalling schemes into a general information interface between the ESIS end CCS. The structure of the ESIS is strictly modular, with separate software segments for each supported signalling system and each variant thereof. By means of these segments, corresponding entities are produced or removed in conjunction with a connection, depending on which connection-specific signalling requests occur. However, despite the different signalling requests, the call control system CCS always sees a general information interface to the ESIS.

In addition, the ESIS is responsible for the connection-related signalling interchange between different signalling systems.

The call control system CCS is used for controlling the connection at the logic level. Its tasks include traffic routing, the standard setting up and clearing down of connections, handling of performance features, informing the charge system and the statistics system of call events, etc. The task area of the CCS includes the control of the physical setting up and clearing down of connections. Although this is initialized by the CCS, it is controlled by the switching control system PSS, however.

The CCS comprises two types of software units, namely static units (managers) and transient units, which are designated call segments. The said call segments produce a series of entities (process or data entities), which communicate with one another via a common information interface, per connection. In the following text, the said instances are also designated segments, and the communicating series of entities are also designated a call chain.

Within the call segments, there are access segments ATS which represent the technical features of the relevant port, user segments UTS which represent the performance features of the user, associater segments AS which represent the association of the A-end and B-end, and feature segments FS which represent non-standard features of a connection, that is to say individual features. The said call segments for a connection are produced or removed as a function of connection-specific stimulation signals and subscriber/network features.

The coordination system LSS coordinates connection requests which originate from different call segments and ESIS segments. For this purpose, the coordination system must buffer store the connection requests received from a segment. This is done in a coordination module LSM which is assigned per segment. Whenever a coordination module receives a new connection request from a segment, the status of the coordination module is evaluated and updated. A distributed control mechanism between the coordination modules ensures that the coordination system produces a consistent physical connection request with respect to the switching control system PSS. According to this control mechanism, the control over an active port is always assigned to one, and only one, coordination module of the coordination system at a specific point in time. If a coordination module has the said control over a port internally, it can submit connection requests for this port to the switching control system.

If a segment submits a connection request for a port over which the coordination module assigned to it has no control at this point in time, there are three alternatives:

1st alternative: the coordination module is authorized to request control over the port (connection end point) from another coordination module, 2nd alternative: the coordination module must wait until another coordination module releases control over the port, 3rd alternative: the coordination module is authorized to transfer the request to another coordination module which can achieve control over the port.

The selection of one of the said alternatives is carried out in accordance with priority rules which correspond with the priority rules for the segments of the ESIS/CCS system. In the case of this system, systems which are located closer to the signaling source (active port) have priority for signals which originate at their connection end. In an analogous manner to this, in the case of the coordination system LSS, those coordination modules which are located closest to the signaling source within the call chain have the highest priority for control of the active port at their connection end. This means that connection requests from segments which are located further away and are thus prioritized lower are made subordinate to those which are located closer to the active port. Connection requests which have been subordinated are stored in the coordination module of the requested segment, and become active as soon as the segment prioritized higher releases control over the active port.

A detailed description of the call control system and of the coordination system is included in the European Application which was submitted at the same time as the present Application and has the type "Koordinierungssystem zur Koordinierung von Verbindungsanforderungen" [Coordination system for coordinating connnection requests], which is attached to this application as an Annex.

The switching control system is described in the following text.

The switching control system is a basic service system for all the user systems of the switching system which request connections within the switching system. Apart from simple connection requests, the switching control system also deals with specific connection requests for the reconfiguration of connections which have been set up for the user systems.

The switching control system produces in each case one autonomous entity per connection request. In consequence, the interfaces to the resource system and to the main switching network (for example receipt of acknowledgements from the resource system or from the main switching network) are independent of the status of the entities of the user system.

The coordination system transforms the private view of a connection, which can be adapted to the segments (entities) of the call control system and of the signaling interface system, into a single consistent connection request with respect to the switching control system. For this reason, the switching control system may carry out connection requests from the coordination system in an unconditional manner. The only reasons for a negative acknowledgement to the coordination system are blocking conditions of the controllers of the switching networks (for example a negative acknowledgement from one of the resource systems RHS) or defects in the switching networks themselves (for example a negative acknowledgement from individual switching networks).

Every connection request to the switching control system causes a new transaction of the switching control system. Such a transaction comprises the control of the resource systems involved and thus the coordination of the setting up of a physical path through the switching networks of the switching system.

Since the actual resource handling (path resources and service unit resources) is separated from the switching control system and is carried out by resource systems independent of them, the switching control system does not require any assignment to a specific central control processor of the central control processors GPx, ... GPy (see FIG. 1). Furthermore, there is no limitation on having to use connection requests, which originate from the same call chain, on the same entity of the PSS. This allows very effective implementation of the functions of the switching control system within the hardware system. Every central control processor can thus operate a plurality of entities of the switching control system in parallel. In consequence, a user system can always submit its connection requests to a switching control system of its own central control processor. Since the switching control system waits for confirmations from the resource systems and/or from the main switching network, it is possible to carry out parallel execution of connection requests for different connections on one single central control processor. For this purpose, one specific particularizing mechanism must be made available per central control processor (for example processed particularizing or data particularizing).

Resources which are assigned to a connection must be stored in a connection-specific manner for the duration of a connection in order to be able to clear down the connection at the end. If these data were stored in the switching control system, it would have to be of considerably more complex construction, for example, if there were in each case one PSS entity for the entire duration of the connection, per connection, this would necessitate an additional state/event coupling within the switching control system and, furthermore, new checks for consistency of the connection requests between the switching control system and the user systems. In order to avoid this increased complexity, the connection data are stored within the respective user system. For example, the connection data for the call processing system are stored in data fields assigned to the coordination system. In order to implement this concept, a so-called "path envelope" is passed backwards and forwards between the user system and the switching control system, which path envelope the current connection data "path data and other resource data" contain. While the path envelope for the user system is a black box, the contents of this path envelope are evaluated by the switching control system in order to carry out an optimum path search for the connection requests.

The switching control system thus represents an autonomous interface to the resource system, which interface allows the call processing system to submit combined connection requests, which contain a resource operation and switching, in a single connection request to the switching control system. In this context, the switching control system ensures that the combined connection request is carried out in a coordinated manner.

In principle, two types of information between the user system and the switching control system can be distinguished: a first type of information which represents a simple connection request for two ports, and a second type of information which represents a request for selection of an SU resource (for example an announcement, jumper) and for its connection to a specific port (combined connection request).

On the basis of a connection request of the first type, the switching control system determines the switching networks affected by the request and coordinates the setting up of the path. If two subscriber units SLU are affected by the connection request, the switching control system initially sends the connection commands to the resource systems on both subscriber unit controllers SLUC in order to select a local path and to connect this path to the main switching network. If this has been done, then the two resource systems pass the selected links, which pass to the main switching network, back to the switching control system. As soon as the switching control system receives this acknowledgement, it can connect the selected links to one another via the main switching network.

A connection request of the second type comprises the statement of a resource type and of the subscriber/trunk who is intended to be connected to the resource. In this case, the task of the switching control system also includes the selection of a suitable switching network, in order to provide the connection with the required resource. If the requested resource is available in the same subscriber unit in which the stated subscriber/trunk is also located, then the switching control system sends a command to the resource system RHS on the controller SLUC of this subscriber unit in order to select a suitable resource for finding a suitable path through the switching network of the subscriber unit and of sending the corresponding routing data to the modules which produce the header translation. If the requested resource type is available only in the central resource pool, the switching control system must also ensure a connection via the main switching network. Data are passed back via associated resources from the resource system to the switching control system and are stored their in the path envelope, for both types of connection request (single connection request and combined connection request), in order to make it possible to clear the connection down later.

In order to form the physical path, the switching control system evaluates the port addresses transferred from the coordination system and uses them to determine the number and type of switching networks which are affected by the requested connection. Before the path through the main switching network can be determined, the links coming from the main switching network must be known. The switching control system therefore initially requests from the resource system the path through the local switching networks, before it requests the path through the main switching network.

The first connection request of the switching control system to the resource system RHS of a subscriber unit SLU to define a local path includes having to provide the statement of a subscriber port and the request for a connection to the main switching network. The resource system of the subscriber unit then carries out the internal path search, selects a link and a VCI-VPI number for the main switching network and sends the routing data corresponding thereto to the modules which carry out the header translations. The selected link and the VCI/VPI identifier are passed back to the switching control system.

The switching control system can now determine the path through the main switching network. For this purpose, the switching control system has a link table which describes the connections on the links between the subscriber units and the main switching network. In addition, this link table also describes connections on links between multiplexers AMUX and the main switching network, as well as access devices AUB from remote subscriber units and the main switching network, so that the switching control system knows that additional routing identifiers must be set for the path to and from the main switching network. In order to set up the path in the main switching network, the switching control system sends corresponding connection commands to the modules, which produce the header translation for the main switching network. In the case of a remote subscriber device, these modules are located in the access device AUB, while in the case of a local subscriber, they are Implemented in the interface circuit IFH of this subscriber unit.

The switching control system also carries out the coordination of the handling of the resources for the call processing system. In this case, the switching control system selects the suitable, requested resources from a pool. For this purpose, the switching control system has a resource table which includes administrative data on the type and location of the resources with which each subscriber unit is equipped, or which are included in a central pool. In general, there is a preference in the selection of a resource since it is, for example, more economical to select the resource locally, that is to say in the subscriber unit, than from a central pool.

If a subscriber unit and, thus, a specific switching network have been defined, via which the resource can be connected, the switching control system coordinates the assignment and the connection of this resource to the desired subscriber/trunk port.

This is done by sending a combined allocation/connection request to the resource system of this subscriber unit. The resource system then selects a suitable resource of the SU, carries out a path search through the switching network of the subscriber unit, and connects the resource to the subscriber/trunk. If the resource is available only in the central pool, the switching control system must also ensure a connection via the main switching network.

The resource table to the switching control system does not contain any transient busy/free information. It is therefore possible for all the resources of a specific type to be encountered in a busy state if the resource system wishes to access them. In this case, the switching control system attempts to carry out the connection request using a different resource system, or it passes a negative acknowledgement back to the user system.

A connection which has been set up must be stored in order that it can later be cleared down again. For this purpose, a so-called "path envelope" is transferred between the user system requesting the connection and the switching control system. The path is stored in this path envelope in the form of path segments which are linked via the switching networks involved. While the switching control system evaluates the contents of the path envelope, this is fully transparent for the user system, or, to put it more precisely, the coordination system, which stores the path envelope during the stable time of the connection.

Figure 3:
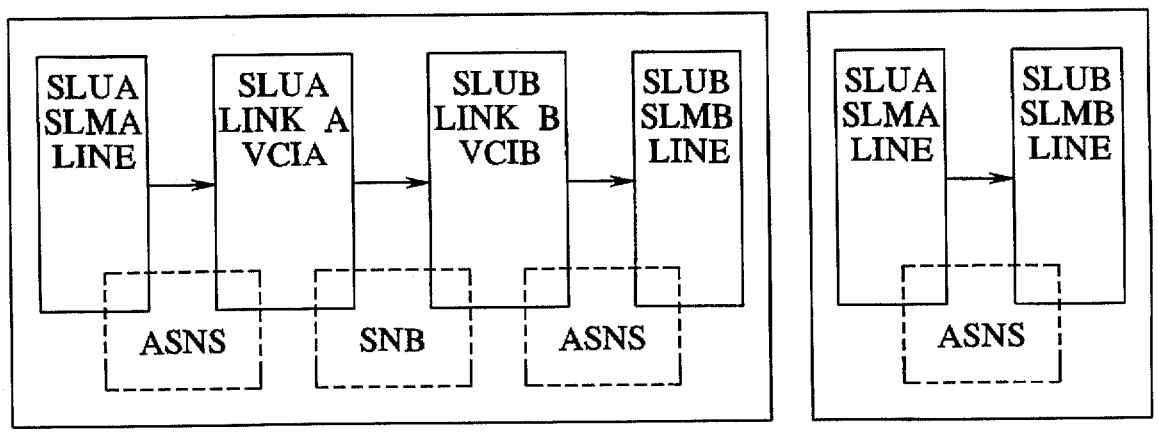
FIG. 3 shows examples of the construction of a path envelope.

FIG. 3 shows the path data, which are stored in a path envelope, for an ATM connection which runs via the main switching network and, furthermore, for an ATM connection which takes place within a subscriber unit. The VPI identifier is not stated there, for reasons of simplicity. In the case of a broadband connection, the term "line" means the port identifier and a VCI/VPI identifier.

In order to carry out a connection request, the switching control system in each case forms the path envelope and passes this back to the user system after carrying out the connection request. For its part, the user system now passes the path envelope back to the switching control system for every new connection control process again, for example for every request to clear a connection down, to interrupt a connection or to reconfigure a connection (for example to place a connection on hold). In these cases, the switching control system evaluates the path envelope again in order to carry out one of the said connection requests. In order to ensure flexible path handling for the said connection request, in particular the complex reconfiguration request, the switching control system makes two functions available to the coordination system, namely a release function and a disconnection function, which are triggered by the requests "release" and "disconnect" respectively.

The complete path is cleared down on the basis of the release request, by means of which the path envelope is at the same time transferred to the switching control system. In this case, the switching control system commands the resource system to release all the resources associated with the connection in the service units SU and to clear down local paths. The switching control system furthermore causes the paths via the main switching network to be cleared down as well, by sending corresponding commands to the modules of the main switching network which produce the header translation.

The path chain is only slightly modified on the basis of the disconnect request, by means of which the path envelope is likewise transferred to the switching control system at the same time. The connection is interrupted at one end of the path which is affected by the disconnect request, while the other end of the path remains in the path chain of the path envelope. The path envelope which is passed back to the coordination system includes the new path configuration.

The coordination system selects the suitable request on the bases of its internal data. For example, the coordination system uses a release request to end a call. In the case of reconfigurations, for example when a feature coordination module requests control over an active port, the most expedient way of providing an announcement is to submit a disconnect request to the switching control system, since the old connection status will undoubtedly be produced again as soon as the announcement has ended.

Figure 4:
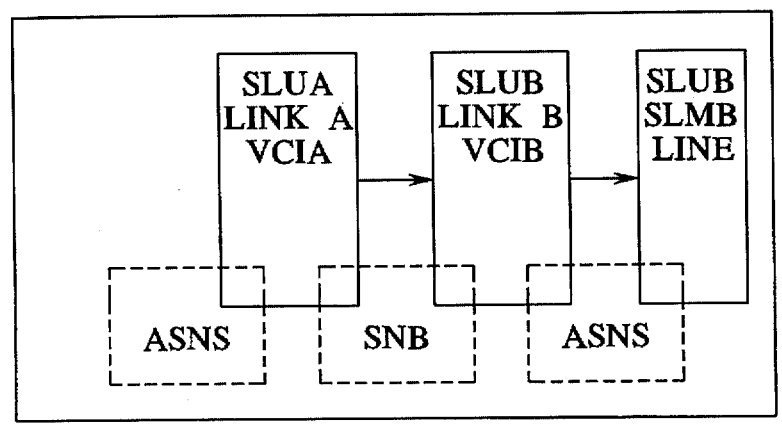
FIG. 4 shows the construction of a path envelope after carrying out a disconnect request.

In the case of a disconnect request, the coordination system must additionally state the interruption point. The interruption point is in this case selected such that it changes the existing configuration as little as possible. For this reason, the interruption point is as far as possible located at that connection end over whose active port the associated feature coordination module requests control. If, for example, a feature coordination module at the A-connection end requests control over its corresponding port, it is more probable that the requested resource is likewise available on the subscriber unit of the A-connection end. The first preference for the allocation of a resource is therefore always the closest subscriber unit, while a common resource pool on the main switching network is used as the second preference. The remaining path chain, which is stored in the path envelope after carrying out a disconnect request from the A-connection end, is illustrated in FIG. 4.

Only the requested active port is passed on via the coordination module chain of the coordination system in order to implement the disconnect function (that is to say no data relating to the associated path chain are passed on between the coordination modules of the coordination system). This results in a simple solution for the handling of the path envelope within the coordination system in the case of this solution, one, and only one, path envelope is always permanently assigned to one coordination module. The path envelope includes path segments which have been assigned to the connection by the switching control system, in response to a connection request itself.

In order to avoid path resources hanging in the air (path resources without any assignment to an active port), path segments must always be associated with at least one active port. Therefore, whenever a coordination module releases control over an active port, this coordination module must ensure that all the path segments associated with this port are cleared down by means of a corresponding request to the switching control system. If the coordination system emits a disconnect request relating to a passive port, that is to say a port which is assigned to a resource, it is necessary to ensure that the associated resource is released again by the switching control system.

Figure 5:
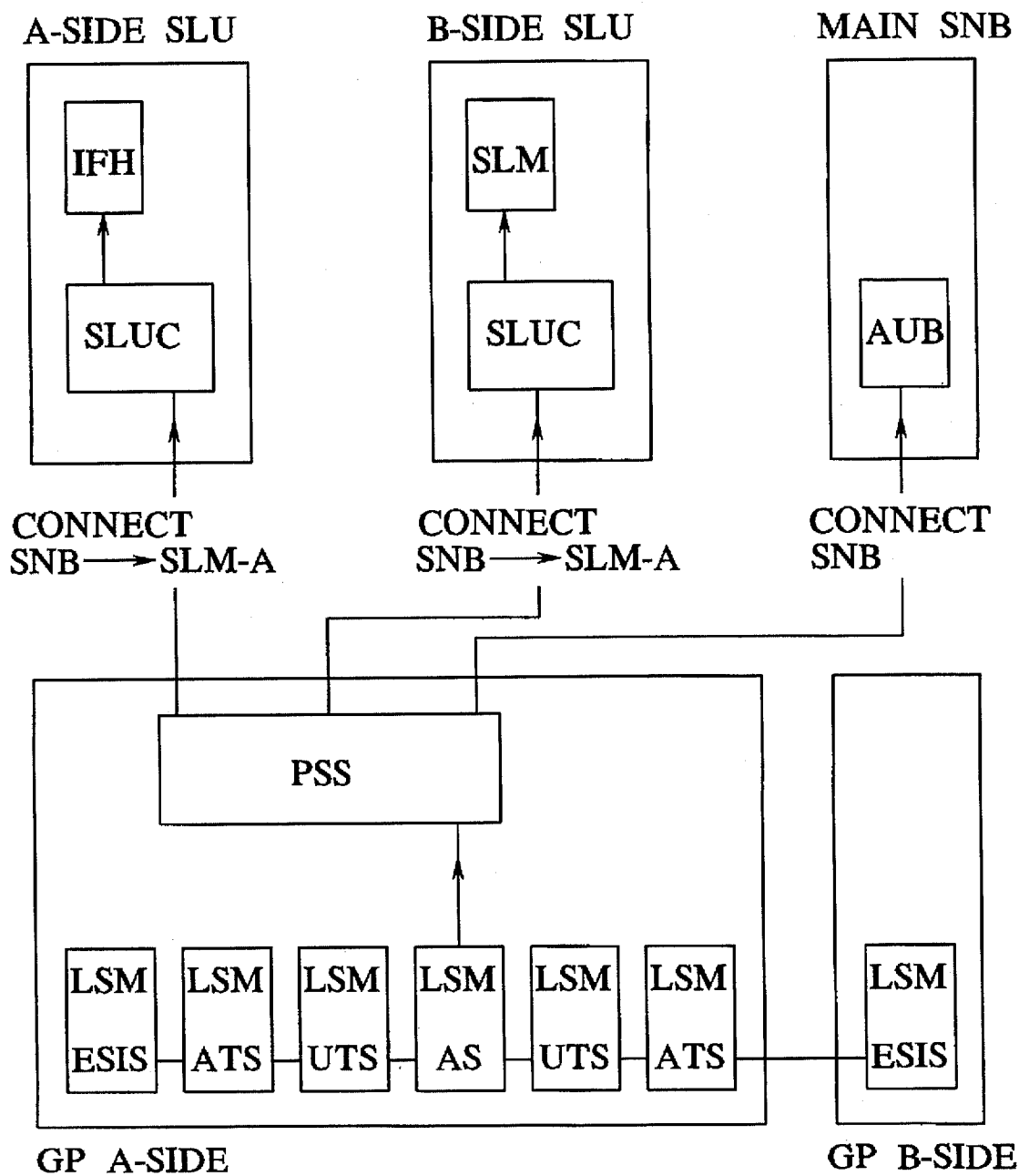
FIG. 5 shows the information flow between the call processing system and the switching control system in the case of a single connection request.

FIG. 5 shows the information flow in the case of a single connection request of the coordination system to the switching control system. In contrast to FIG. 1, the subscriber unit SLUB in FIG. 5 is a remote subscriber unit. The following steps are carried out in this case: In a first step, the segment AS transfers the single connection request by means of its coordination module LSM to the switching control system PSS.

In a second step, the switching control system PSS requests the subscriber unit controllers SLUC of the subscribers A and B to provide suitable paths to the main switching network SNB.

The two subscriber unit controllers then carry out a corresponding path search through their local switching networks and select corresponding links to the main switching network. The subscriber unit controller SLUCA thus determines a corresponding link, a corresponding VCI identifier and routing identifier, sends the routing identifiers to the subscriber module SLM and passes the corresponding link and the associated VCI identifier back to that control processor GP which includes the requesting switching control system.

The subscriber unit controller of the subscriber B likewise determines the link, the VCI identifier and the routing identifier, sends the routing identifier to the interface unit IFH and subsequently passes the link which has been determined and the FCI identifier which has been determined back to the said control processor GP.

In a fourth step, the PSS of the said control processor GP determines the routing identifier for the main switching network SNB, and sends this identifier to the access device AUB of the main switching network.

Figure 6:
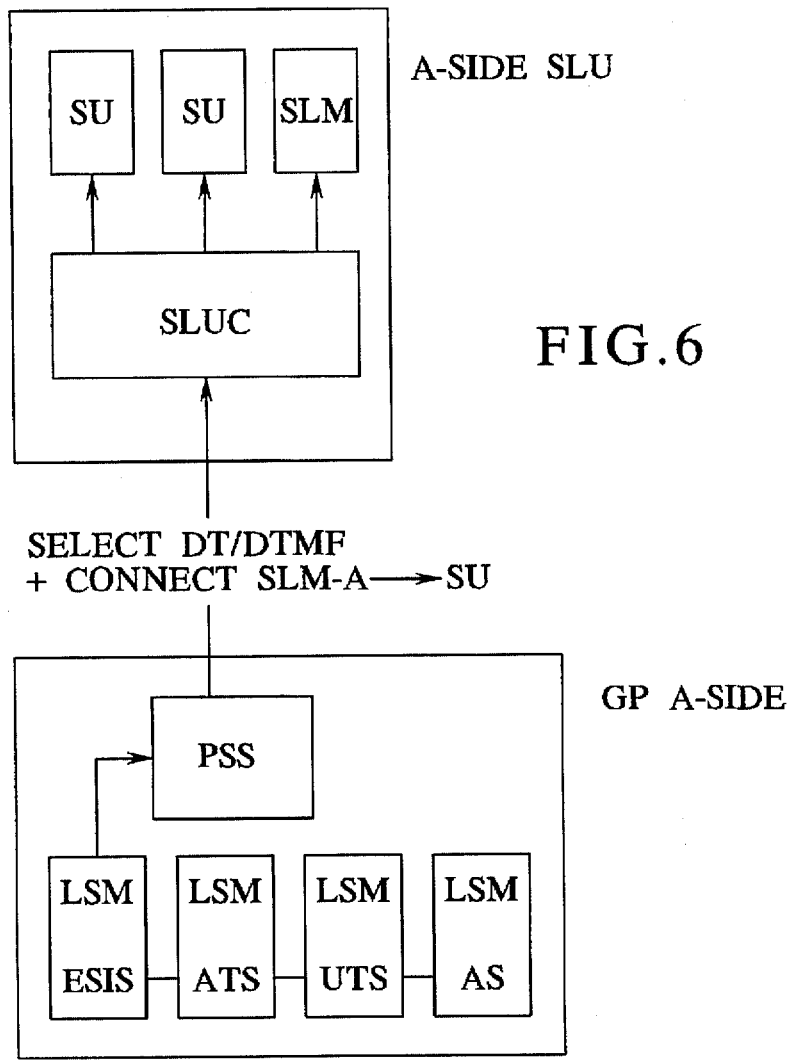
FIG. 6 shows the information flow between the call processing system and the switching control system in the case of a combined connection request.

FIG. 6 shows the information flow in the case of a combined connection request. The combined connection request considered in FIG. 6 is: select a free DTMF receiver and dialling tone and connect them to a specific subscriber. If a resource (for example the DTMF receiver) which is stated in the combined connection request is available in a plurality of pools, then the control processor GP determines the preferred pool from which the resource is taken. The free/busy operation of the resource itself is carried out in the case of a local pool (service unit SU of a subscriber unit SLU) by the subscriber unit controller SLUC or, in the case of a central pool, by the control processor GP.

The individual steps of the combined connection request are stated in the following text:

In a first step, the controller processor GP determines the resource pool from which the resources specified in the connection request, namely the DTMF receiver and the dialling tone, are selected. In the present case, a local resource pool is selected, namely the pool of the subscriber unit SLU of the subscriber initiating the connection request.

In a second step, the control processor GP requests the subscriber unit controller SLUC to select the said resources from suitable service units, and then to connect them to the subscriber.

Figure 7:
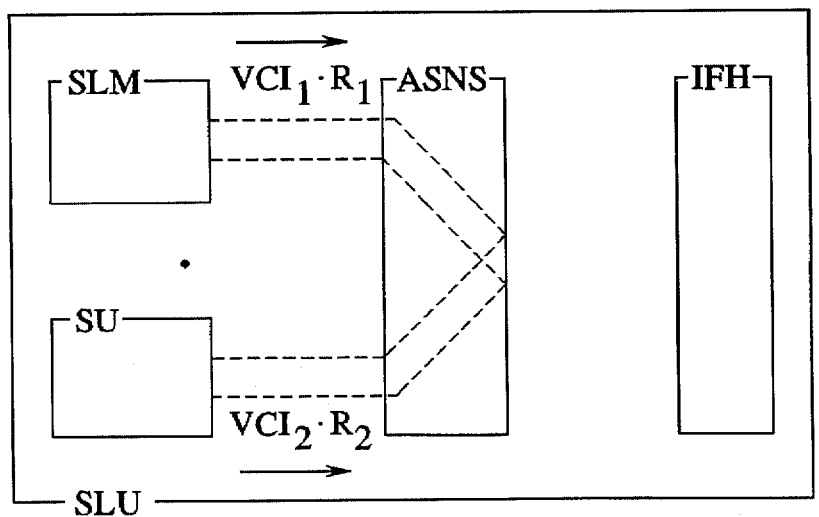
FIG. 7 shows the path of the connection formed by the information flows in FIG. 6.

In a third step, the subscriber unit controller searches through its free/busy table and allocates the said resources from the suitable service units to the connection request in order thus to provide the requested service. The subscriber unit controller then activates the said resources, determines a first routing identifier R1 and a second routing identifier R2, and then sends the first routing identifier to the subscriber module SLM (DTMF receiver), and the second routing identifier to the service unit SU of the dialling tone, as can be seen in FIG. 7. Finally, the subscriber unit controller transfers the identifiers of the allocated service units SU to the control processor GP, as connection data for subsequent connection control processors.

FIG. 7 shows the path, which is set up by the information flows of FIG. 6, of the connection.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed:

1. A switching system, comprising:

a) at least one control processor for carrying out central control processes;

b) one, and only one, switching control system per control processor, said switching control system having means for receiving connection requests from at least one user system, the user system being used to control logic connection structures, and a connection request containing identifiers for connection end points affected by it, having means for processing said connection requests, which means for processing calculate a physical path through switching networks of the switching system based on a connection request, and having means for transmitting commands to resource systems for local control of resources which are affected by the calculated physical path;

c) at least one user system for controlling logic connection structures per control processor; and d) local resource systems for controlling the resources of the switching system, which resource systems carry out commands of the switching control system.

2. The switching system as claimed in claim 1, wherein a) a user system is built up from a plurality of segments, and b) each segment autonomously carries out a subfunction of a logic connection controller.

3. The switching system as claimed in claim 2, wherein;

a) one chain of entities of required segments is built up per connection, b) a plurality of entities of said chain submit mutually independently produced connection requests to the switching control system, and c) said chain of a connection extends over a plurality of control processors.

4. The switching system as claimed in claim 3, wherein said user system includes a coordination system which coordinates said connection requests with respect to the switching control system in such a manner that, at a specific time, only one consistent connection request is in each case dealt with per connection by the switching control system.

* * * * *